March 4, 1958
R. F. HIGH
2,825,093
SKIN-COVERING MOLD
Filed Dec. 5, 1955
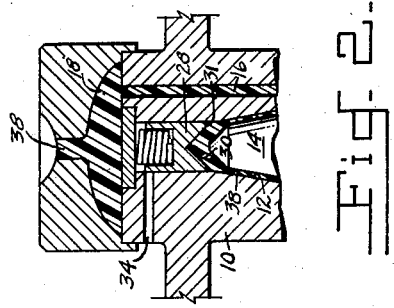
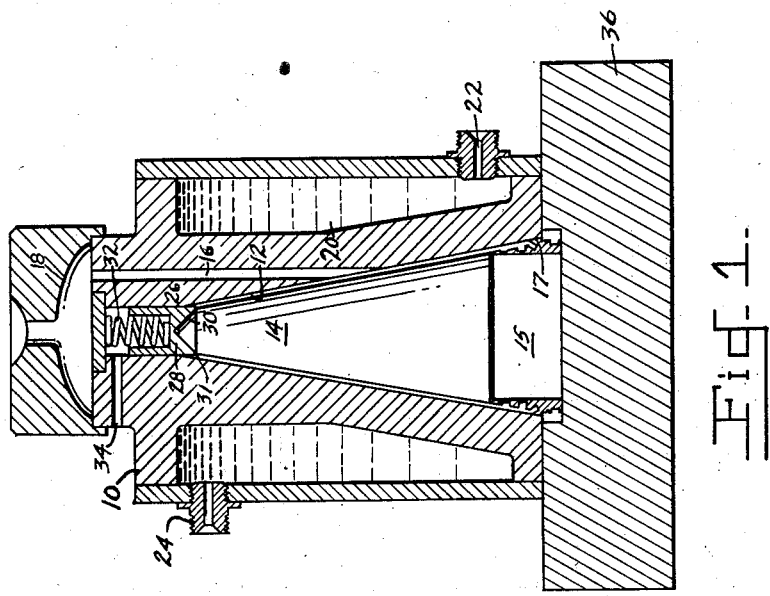
INVENTOR
Roy F. High
BY W. E. Thibodeau, A. W. Dew
and J. D. Edgerton ATTORNEYS

2,825,093
SKIN-COVERING MOLD

Roy F. High, Washington, D. C.

Application December 5, 1955, Serial No. 551,182

1 Claim. (Cl. 18—42)

(Granted under Title 35, U. S. Code (1952), sec. 266)

The invention described herein may be manufactured and used by or for the Government for governmental purposes without the payment to me of any royalty thereon.

This invention relates to coating articles in a plastic sheath by centering the article in a mold and injecting plastic material.

The invevntion provides a mold having a spring-pressed centering plug for positioning the article being coated. Plastic material is forced into the mold around the article and holds it in place. When this plastic material fills the mold, the pressure causes retraction of the centering plug so that the space formerly occupied by the plug becomes filled with plastic material.

An object of this invention is to completely cover an article with molded plastic.

Another object of this invention is to provide a device for producing an article accurately centered in a plastic sheath.

An additional object is to achieve the above simply and cheaply.

Other objects, aspects, uses and advantages of the invention will become apparent from the following description and the accompanying drawing, in which:

Fig. 1 is a longitudinal sectional view of the mold.

Fig. 2 is a fragmental view similar to Fig. 1 with the centering plug retracted.

The mold body 10 has a molding cavity 12. The molding cavity is conical or ogival and similar in shape, but larger than fuze 14 which in this embodiment is the article to be coated. The fuze base 15 is so shaped that it forms a seal at 17 with the cavity. In a conventional manner three sprues or passageways 16 (only one of which shows in the drawings) lead from cold slug well 18 to the molding cavity 12. The mold has a conventional water jacket 20 with inlet 22 and outlet 24.

At the tip of the molding cavity 12 is a cylindrical opening 26 coaxial with the cavity in which is slidably mounted a centering plug 28. The bottom surface of the centering plug has a conic depression 30 the base of which is surrounded by annular plane surface 31. Spring 32 presses the centering plug 28 toward the molding cavity. Hole 34 vents the upper portion of cylindrical opening 26 to the atmosphere.

In operation the fuze 14 is placed on base plate 36 and the mold body 10 is positioned over it. The fuze is accurately centered in the mold cavity by the base at 17 and by the centering plug depression 30. Plastic material 38 is forced by pressure through well 18 and sprues 16 into the molding cavity. The material is sufficiently unyielding or rigid to hold the fuze firmly in place. As the cavity fills, the plastic material 38 acting on surface 31 automatically pushes the centering plug away from the fuze so that this area is completely covered by the plastic sheath.

It will be apparent that the embodiment shown is only exemplary and that various modifications can be made in construction and arrangement within the scope of the invention as defined in the appended claim.

I claim:

A mold for coating ordnance fuzes with plastic material, comprising: a mold body with a molding cavity of similar shape but larger than a fuze, sprues connecting the molding cavity to a source of plastic material under pressure, a centering plug with a conic depression for centering said fuze mounted for movement in the mold body with that portion of the centering plug containing the depression extending into the molding cavity, a spring between the centering plug and mold body biasing the plug toward the molding cavity, an annular plane surface on said centering plug adjacent the base of said conic depression for cooperating with said plastic material to move the centering plug from said fuze so that the entire surface of said article adjacent said plug will be automatically coated by said plastic material.

References Cited in the file of this patent

UNITED STATES PATENTS

| 2,163,814 | Swarovski | June 27, 1939 |
| 2,405,329 | Ruebensaal | Aug. 6, 1946 |

FOREIGN PATENTS

| 388,662 | Great Britain | Mar. 2, 1933 |